March 21, 1944.  W. L. ADAMS  2,344,665
FISHING REEL SPOOL CONSTRUCTION
Filed Dec. 31, 1941
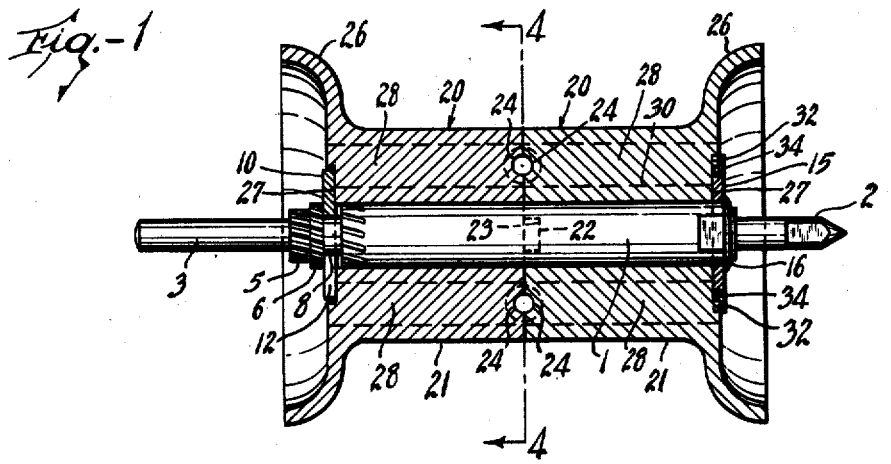
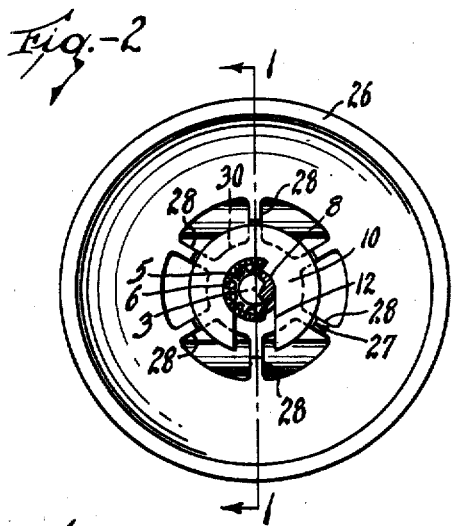
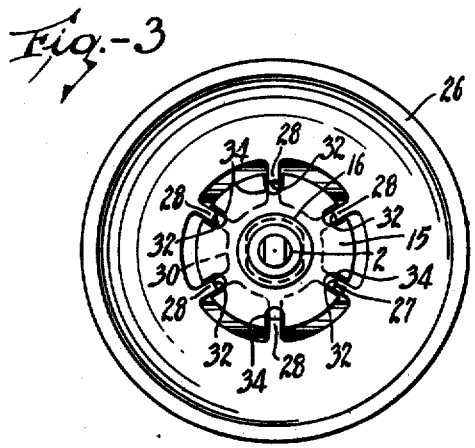
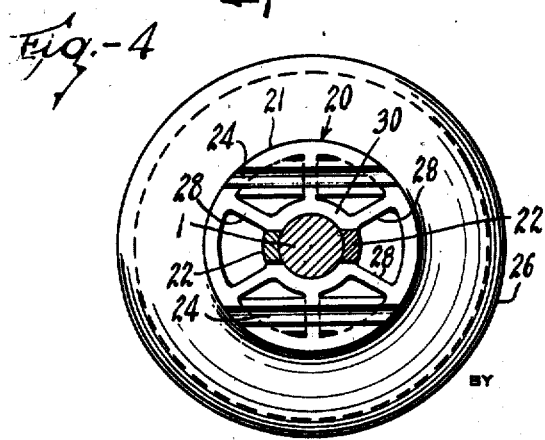
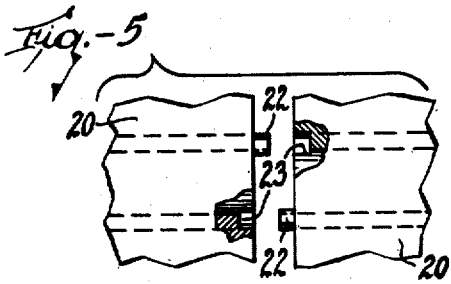
INVENTOR
WALTER L. ADAMS
ATTORNEYS Patented Mar. 21, 1944

2,344,665

UNITED STATES PATENT OFFICE 2,344,665

FISHING REEL SPOOL CONSTRUCTION

Walter L. Adams, Akron, Ohio, assignor to The Enterprise Manufacturing Company, Akron, Ohio, a corporation of Ohio Application December 31, 1941, Serial No. 425,103

6 Claims. (Cl. 242—125)

The present invention relates to construction and design of spools for fishing reels of various types and may be employed for either fresh or salt water reels. It is the object of the invention to design a spool which may be made of a moldable plastic material for lightness and cheapness without sacrificing any of the efficiency of the old metal spools. As the spool is much lighter than the old type spool, it is admirably adapted for use in bait-casting reels and particularly reels of the type in which the momentum of the spool is sought to be reduced by decreasing its weight.

Another object of the invention is to provide a spool of this type which is made of two complementary halves, and as the two halves are alike, only one mold need be employed, and the spool is more easily assembled. Each spool section is designed with interior longitudinal passages for lightness and the ribs, which connect the line-receiving surface of the spool with the central bearing sleeve, are utilized for driving the spool from the shaft.

It is also an object to design a spool which is made by simple casting steps and which may be assembled and positively driven by simple but effective means.

While the preferred form of the invention is shown and described herein, it will be understood that changes and modifications may be employed within the scope of the claims. To illustrate the invention in its entirety, a light, cored-out spool construction is shown, but certain features of the invention may be employed with solid sections.

In the drawing:

Fig. 1 is a longitudinal section through a complete spool of the invention assembled upon the shaft and locked thereon, the section being on the line 1—1 of Fig. 2;

Fig. 2 is an end elevation of the spool looking at the end which carries the driving pinion;

Fig. 3 is a view looking at the opposite end where the spool driver is located;

Fig. 4 is a section on the line 4—4 of Fig. 1; and

Fig. 5 is a fragmentary view showing the abutting or inner ends of the two spool halves or sections separated sufficiently to show the keying thereof.

In the drawing, 1 represents the spool shaft which extends through the spool and is reduced at both ends, the section marked 2 being intended to project through the back plate of the reel and the section 3 being intended to project through the front plate and into the usual gear casing where the driving gears are located. These parts of the reel are not illustrated as they form no part of the present invention and may be of any usual or preferred design.

The end of the main shaft body at the base of the section 3 is milled, as shown at 5, to receive and interlock with the usual click ratchet and driving pinions, not shown.

Inwardly of the formation 5 the shaft is cut away to form a groove 8 which provides the seat for a retainer disk 10 which acts as an abutment for one side of the spool. In the form shown, this retainer is a circular disk which fits within a socket or recess formed on the side of the adjacent spool section and is provided with a slot 12 which will permit the retainer to be passed over the shaft when the spool is assembled. The opposite end of the shaft body is cut away to provide flattened surfaces to interlock with a correspondingly shaped hole in a second disk 15 which acts as a driver for the spool and is held in position when the spool is assembled on the shaft by spinning the stock of the shaft over the disk, as at 16, which operation unites the entire spool assembly.

The spool sections 20 are identical, as stated above. Each is formed with a cylindrical body or line-receiving portion 21, the inner face of which is formed with a projecting dowel or tongue 22 on one side of the axis of the spool section and a corresponding recess 23 on the opposite side of the axis. When the two spool sections are assembled upon the shaft, the parts 22 and 23 interlock and prevent relative rotation of the spool sections. In the abutting face of each spool section are located two grooves 24 which, when the spool is assembled, form transverse passages for tying the line to the spool. It will be seen that there is no right and left spool section and either section may be used at either end of the spool.

The outer end of each spool section is formed with the usual flange 26 and in its outer face is provided the circular socket or pocket 27 which will receive either part 10 or 15.

In the form shown, the center of the spool section is cored out for lightness by the provision of a plurality of longitudinal passages formed by radial ribs 28 which connect the line-receiving portion and the central barrel or sleeve 30 which fits over the shaft. As the socket 27 is less in diameter than the space which is cored out, the ribs provide teeth 32 and the driver disk 15 is formed with notches 34 which interlock with these teeth to form the driving connection between the spool and the shaft. If the spool section is not cored, teeth may be molded about the socket 27.

In assembling the spool, one section is passed over the shaft, the disk 10 inserted in the groove 8 and the spool section moved to its seated position with the disk in the socket 27. The other spool section is then passed over the shaft to its final position, interlocking the two spool sections. The driving disk 15 is now placed over the shaft to interlock therewith and with its notches in engagement with the teeth 32. The operation of spinning over at 16 completes the assembly.

If desired, a removable locking means which will permit easy disassembly of the spool may be substituted for the spinning operation at 16. This will permit a spool section to be replaced in case of breakage without destroying the spool. A screw threaded ring or a split locking ring may be used for this purpose.

It will be seen that the construction of the spool permits of easy assembling operations and that a strong, but light spool is provided. The interchangeability of the spool sections is distinctly advantageous for manufacture and assembly. The spool sections are prevented from relative rotation and are positively driven from the central shaft.

What is claimed is:

1. A spool assembly for fishing reels, comprising a central shaft, a groove at one end of the shaft, a spool section on the shaft the outer face of which is provided with a socket, a disk fitting into the socket and having a radial slot by which it may be seated in the groove, a second spool section on the shaft, a second disk fitting in a socket on the second spool section, and means on the second disk to interlock the shaft and the spool section against relative rotation.

2. A spool assembly for fishing reels, comprising a central shaft, a groove at one end of the shaft, a spool section on the shaft the outer face of which is provided with a socket, a disk fitting into the socket and having a radial slot by which it may be seated in the groove, a second spool section on the shaft, a second disk fitting in a socket on the second spool section, means on the second disk to interlock the shaft and the spool section against relative rotation, and means to hold the spool sections against relative rotation.

3. A spool for fishing reels, comprising a shaft, two like mating sections on the shaft, each section being formed with an outer line-receiving portion and an interior sleeve which fits over the shaft, ribs connecting the sleeve and the line-receiving portion, and a disk to secure the sections on the spool and having formations to interlock with the ribs.

4. A spool for fishing reels, comprising a central shaft and two like spool sections mounted on the shaft, each section being made from a plastic material and having a line-receiving portion and a sleeve fitting over the shaft, ribs connecting the sleeve and the line-receiving portion of each spool section to provide longitudinal passages through the center of the spool, means to interlock the spool sections, and means to drive the spool from the shaft, said spool driving means interlocking with the ribs.

5. A spool for fishing reels, comprising a central shaft and two like spool sections mounted on the shaft, each section being made from a plastic material and having a line-receiving portion and a sleeve fitting over the shaft, ribs connecting the sleeve and the line-receiving portion of each spool section to provide longitudinal passages through the center of the spool, means to interlock the spool sections, and means to drive the spool from the shaft, said spool driving means consisting of a disk abutting the outer end of one of the spool sections and having means to interlock with the shaft and with the ribs on the adjacent spool section.

6. A spool for fishing reels comprising a shaft, two like spool sections, means to interlock the sections against relative rotation, means to hold the sections together to form a complete spool, means to interlock the spool and the shaft, and two transverse grooves formed in abutting surfaces of the spool sections on opposite sides of the shaft to form transverse line receiving passages.

WALTER L. ADAMS.